United States Patent [19]
Horvath

[11] 3,954,592
[45] May 4, 1976

[54] ELECTROLYSIS APPARATUS
[75] Inventor: Stephen Horvath, St. Ives, Australia
[73] Assignee: Beeston Company Limited, Hong Kong
[22] Filed: Nov. 25, 1974
[21] Appl. No.: 527,083

Related U.S. Application Data
[63] Continuation-in-part of Ser. No. 485,498, July 3, 1974, abandoned.

[52] U.S. Cl. .............................. 204/228; 204/129; 204/272; 204/DIG. 9
[51] Int. Cl.² ..................... C25B 9/04; C25B 11/02; C25B 15/02; C25B 1/04
[58] Field of Search ............... 204/272, DIG. 9, 129, 204/228

[56] References Cited
UNITED STATES PATENTS

| | | | |
|---|---|---|---|
| 2,016,442 | 10/1935 | Kilgus | 204/129 |
| 3,262,872 | 7/1966 | Rhodes et al. | 204/272 |
| 3,433,729 | 3/1969 | Proskuryakov et al. | 204/272 |
| 3,616,434 | 10/1971 | Hausner | 204/228 |
| 3,758,399 | 9/1973 | Pendergrass | 204/228 |

Primary Examiner—R. L. Andrews
Attorney, Agent, or Firm—Biebel, French & Nauman

[57] ABSTRACT

A novel electrolytic cell performs an electrolysis process at improved efficiencies by supplying a pulsed DC current to the electrodes thereof. In preferred embodiment a generally cylindrical anode with a fluted outer surface is surrounded by a segmented cathode having an active area equal to the active area of the anode. An electrolyte, which may be a 25 percent solution of potassium hydroxide is introduced into the cell for production of hydrogen and oxygen at the cathode and anode respectively. The current for carrying on the electrolysis process is provided by a transformer which is preferably located within an oil filled chamber inside the anode. Heat from this transformer and a magnetic field also created thereby both have a beneficial effect upon the reaction rates. The pulsing of the electrode current may in one embodiment be carried out at a rate of between 5,000 and 40,000 pulses per minute, with a rate of about 10,000 pulses per minute being preferred. In such an arrangement the current level may be about 220 amps at a duty cycle of about 0.006 and the electrode voltage may be about 3 volts. Thus there are produced very short, sharp pulses which have been found to be very effective in the production of reaction products. Appropriate circuitry is disclosed for providing a driving signal to the transformer, as well as an arrangement for safely taking off the reaction products and stopping the process upon sensing of a predetermined internal pressure.

22 Claims, 8 Drawing Figures 3,954,592

ELECTROLYSIS APPARATUS

CROSS REFERENCE TO RELATED APPLICATION

This is a continuation-in-part of application Ser. No. 485,498 filed July 3, 1974 now abandoned.

BACKGROUND OF THE INVENTION

This invention relates to electrolysis and has particular, but not exclusive, application to the electrolysis of water to form hydrogen and oxygen.

In electrolysis a potential difference is applied between an anode and a cathode in contact with an electrolytic conductor to produce an electric current through the electrolytic conductor.

Many molten salts and hydroxides are electrolytic conductors but usually the conductor is a solution of a substance which dissociates in the solution to form ions. The term "electrolyte" will be used herein to refer to a substance which dissociates into ions, at least to some extent, when dissolved in a suitable solvent. The resulting solution will be referred to as an "electrolyte solution".

Faraday's Laws of Electrolytis provide that in any electrolysis process the mass of substance liberated at an anode or cathode is in accordance with the formula $$m = zq$$

where
- $m$ is the mass of substance liberated in grams,
- $z$ is the electrochemical equivalent of the substance, and
- $q$ is the quantity of electricity passed, in coulombs.

An important consequence of Faraday's Laws is that the rate of decomposition of an electrolyte is dependent on current and is independent of voltage. For example, in a conventional electrolysis process in which a constant current I amps flows for $t$ seconds, $q = It$ and the mass of material deposited or dissolved will depend on I regardless of voltage, provided that the voltage exceeds the minimum necessary for the electrolysis to proceed. For most electrolytes, the minimum voltage is very low.

The prior art shows electrolytic reactions employing DC or rectified AC which necessarily will have a ripple component; an example of the former being shown for instance in Kilgus U.S. Pat. No. 2,016,442 and an example of the latter being shown in Emic et al U.S. Pat. No. 3,485,742. It will be noted that the Kilgus patent also discloses the application of a magnetic field to the electrolyte, which field is said to increase the production of gas at the two electrodes.

SUMMARY OF THE INVENTION

The present invention aims at making more effective use of a source of electrical energy to generate products of electrolysis than hereto has been possible. In the method of the invention a pulsating current is applied to an electrolytic conductor maintained within an electrolytic cell. In accordance with this method pulses of quite high current value and appropriately low voltage can be generated in the electrolytic conductor by a quite modest direct current input supply to produce a greatly increased yield of electrolysis products over that which could be achieved by passing the supply current through the conductor. This pulsating current is to be distinguished from normal variations which occur in rectification of AC current, and as hereinafter employed the term pulsed current will be taken to mean a current having a duty cycle of less than 0.5.

The apparatus of the invention is adapted to practice the foregoing method and moreover has a novel configuration which improves electrolytic reactions by reducing electrical losses and producing increased electron mobility, and accordingly it is an object of this invention to provide electrolysis apparatus having such a novel configuration.

Another object of the invention is to provide a method of electrolysis comprising putting a mass of an electrolytic conductor between and in contact with an anode and a cathode disposed about the anode and applying pulses of electrical energy so as to induce a pulsating current in the electrolytic conductor.

The said pulses of electrical energy may be obtained by electrical conversion of a constant direct current supply of substantially uniform voltage and current. In one electrolysis method according to the invention the pulses of electrical energy as applied between the anode and cathode are each at a greater current value than said uniform current and a lower voltage value than said uniform voltage whereby the pulsating current in the electrolytic conductor is comprised of pulses each having a greater current value than said uniform current and a lower voltage value than said uniform voltage. In an alternative electrolysis process according to the invention, the pulses of electrical energy as applied between the anode and cathode are each at a relatively high voltage which is sufficient to cause the anode and cathode to discharge in such a manner as to produce within the electrolytic conductor pulses of current which are greater than said uniform current and constitute said pulsating current.

A still further object of the invention is to provide electrolysis apparatus comprising:

a. an electrolytic cell to hold an electroltic conductor and including an anode and a cathode to contact the electrolytic conductor, and b. electrical supply means to apply between the anode and cathode of the electrolytic cell pulses of electrical energy to induce a pulsating current in the electrolytic conductor.

As previously mentioned, the invention is particularly applicable to the electrolysis of water or aqueous solutions to generate hydrogen and oxygen gases and, in order that the invention may be more fully explained, apparatus designed specifically for such generation of hydrogen and oxygen will now be described in detail with reference to the accompanying drawings.

DESCRIPTION OF THE PREFERRED EMBODIMENTS

The illustrated apparatus comprises an electrolytic cell denoted generally as 11 and having an anode 12 and cathode 13. In accordance with the present invention, pulses of electrical energy are applied between the anode 12 and cathode 13 and this produces pulses of high current flow through an electrolyte solution in the cell. Two alternative circuits for producing the pulses of electrical energy are shown n FIGS. 1 and 2.

Figure 1:
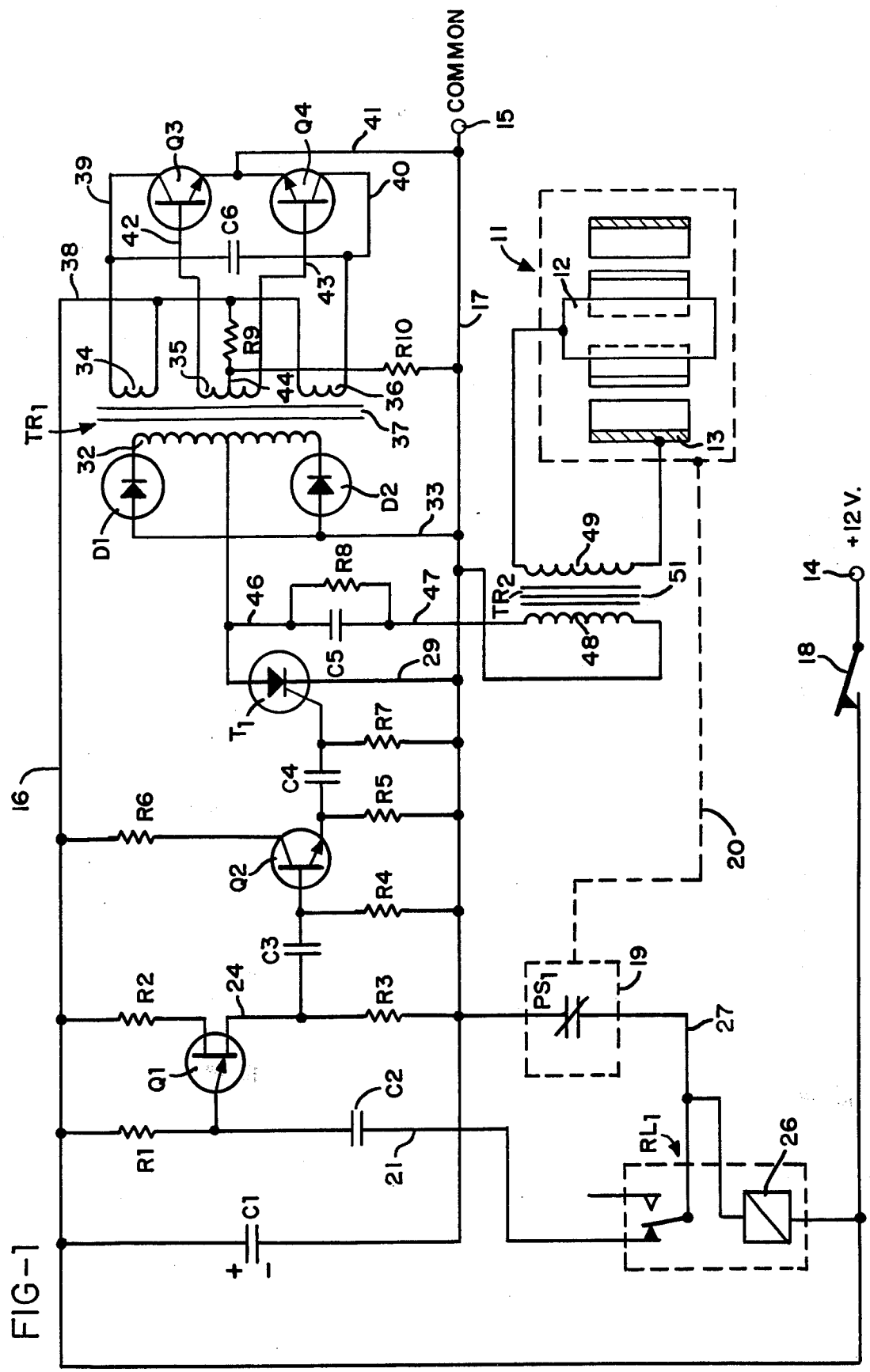
FIG. 1 is one possible circuit diagram for the apparatus.
Figure 2:
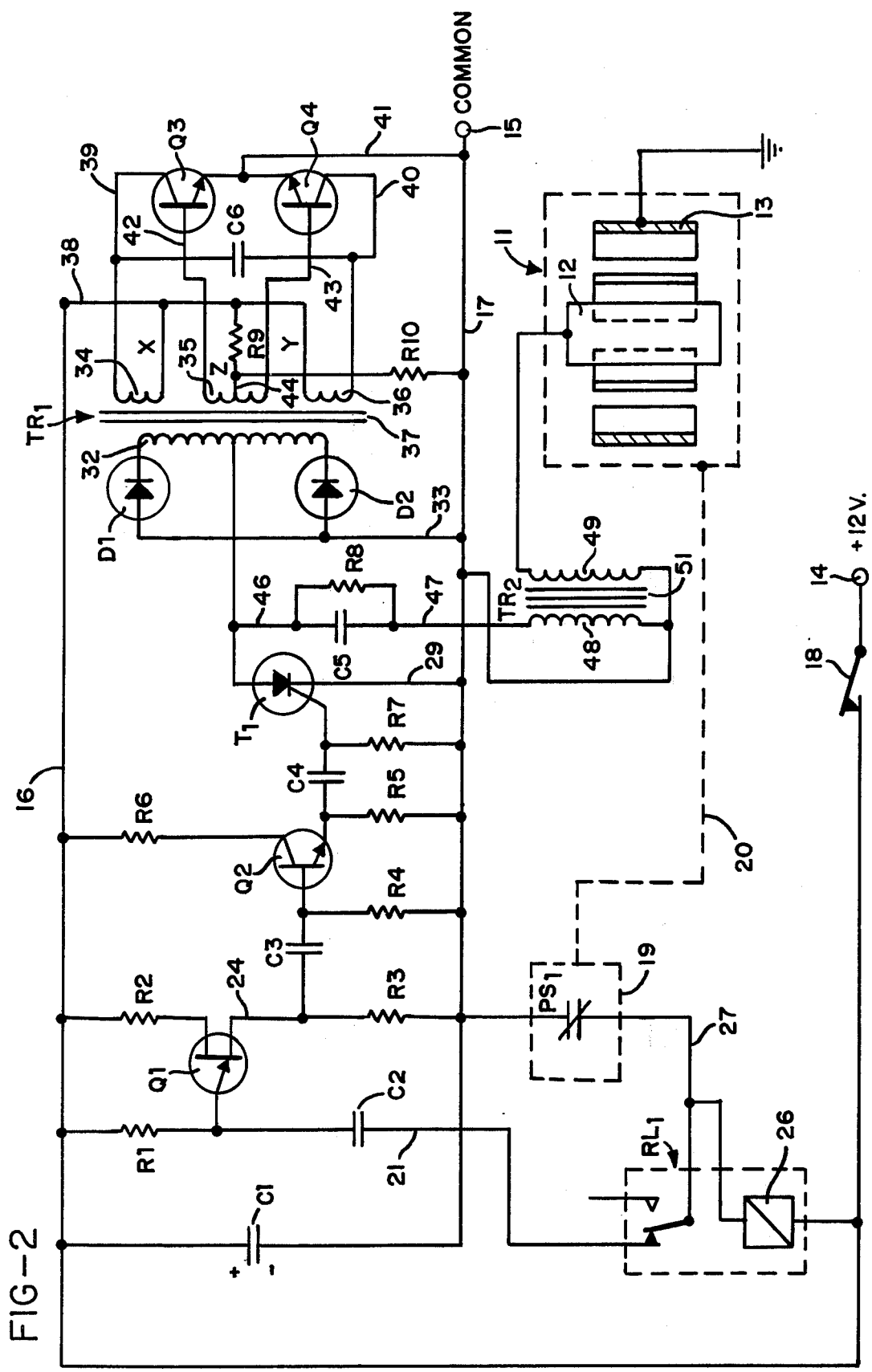
FIG. 2 is a circuit diagram for a slightly modified form of the apparatus.

The two circuits illustrated in FIGS. 1 and 2 are largely the same and like parts have been identified by like reference numerals. The only differences between the two circuits lie in the winding of a final stage transformer which is installed within the anode of cell 11 and the electrical connections of the secondary coil of that transformer.

In each circuit a source of direct current electrical energy, which may for example be a 12 volt battery, is connected between terminals 14, 15 so that line 16 from terminal 14 may be considered as receiving a positive input and line 17 from terminal 15 may be considered as a common negative for the circuit. Line 16 includes a simple ON/OFF master control switch 18.

Each of the illustrated circuits comprises pulse generator circuitry comprising unijunction transistor Q1 with associated resistors R1, R2, R3 and capacitors C2 and C3. This circuitry produces pulses which are used to trigger an NPN silicon power transistor Q2 which in turn provides via a capacitor C4 triggering pulses for a thyristor T1.

Resistor R1 and a capacitor C1 are connected in series in a line 21 extending to one of the fixed contacts of a relay RL1. The coil 26 of relay RL1 is connected between line 16 and a line 27 which extends from the moving contact of the relay to the common negative line 17 via a normally closed pressure operated switch 19. The pressure control line 20 of switch 19 is connected in a manner to be described below to a gas collection chamber of electrolytic cell 11 in order to provide a control connection whereby switch 19 is opened when the gas in the collection chamber reaches a certain pressure. However, provided that switch 19 remains closed, relay RL1 will operate when master control switch 18 is closed to provide a connection between lines 21 and 27 thereby to connect capacitor C2 to the common negative line 17. The main purpose of relay RL1 is to provide a slight delay in this connection between the capacitor C2 and the common negative line 17 when the circuit is first energized. This will delay the generation of triggering pulses to thyrister Tl until a required electrical condition has been achieved in the transformer circuitry to be described below. It is preferred that relay RL1 be hermetically sealed and have a balance armature so that it can operate in any position and can withstand substantial shock or vibration.

When the connection between capacitor C2 and line 17 is made via relay RL1, unijunction transistor Q1 will act as an oscillator to provide positive output pulses in line 24 at a pulse rate which is controlled by the ratio of R1:C1 and at a pulse strength determined by the ratio of R2:R3. These pulses will charge the capacitor C3. Electrolytic capacitor C1 is connected directly between the common positive line 16 and the common negative line 17 to filter the circuitry from all static noise.

Resistor R1 and Capacitor C2 are chosen such that at the input to transistor Q1 the pulses will be of saw tooth form. This will control the form of the pulses generated in the subsequent circuitry, and the saw tooth pulse form is chosen since it is believed that it produces the most satisfactory operation of the pulsating circuitry. It should be stressed, however, that other pulse forms, such as square wave pulses, could be used. Capacitor C3, which is charged by the output pulses of transistor Q1, discharges through a resistor R4 to provide triggering signals for transistor Q2. Resistor R4 is connected to the common negative line 17 to serve as a gate current limiting device for transistor Q2.

The triggering signals produced by transistor Q2 via the network of capacitor C3 and resistor R4 will be in the form of positive pulses of sharply spiked form. The collector of transistor Q2 is connected to the positive supply line 16 through resistor R6 while the emitter of that transistor is connected to the common negative line 17 through resistor R5. These resistors R5 and R6 control the strength of current pulses applied to a capacitor C4 which discharges through a resistor R7 to the common negative line 17, thereby to apply triggering signals to the gate of thyristor T1. The gate of thyristor T1 receives a negative bias from the common negative line via resistor R7 which thus serves to prevent triggering of the thyristor by the inrush currents.

The triggering pulses applied to the gate of thyristor T1 will be very sharp spikes occurring at the same frequency as the saw tooth wave form pulses established by unijunction transistor Q1. It is preferred that this frequency be of the order of 10,000 pulses per minute and details of specific circuit components which will achieve this result are listed below. Transistor Q2 serves as an interface between unijunction transistor Q1 and thyristor T1, preventing backflow of emf from the gate of the thyristor, which might otherwise interfere with the operation of transistor Q1. Because of the high voltages being handled by the thyristor and the high back emf applied to transistor Q2, the latter transistor must be mounted on a heat sink.

The cathode of thyristor T1 is connected via a line 29 to the common negative line 17 and the anode is connected via a line 31 to the center of the secondary coil 32 of a first stage transformer TR1. The two ends of transformer coil 32 are connected via diodes D1 and D2 and a line 33 to the common negative line 17 to provide full wave rectification of the transformer output.

First stage transformer TR1 has three primary coils 34, 35, 36 wound together with secondary coil 32 about a core 37. This transformer may be of conventional half cup construction with a ferrite core. The secondary coil may be wound on to a coil former disposed about the core and primary coils 34 and 36 may be wound in bifilar fashion over the secondary coil. The other primary coil 35 may then be wound over the coils 34, 36. Primary coils 34 and 36 are connected at one side by a line 38 to the uniform positive potential of circuit line 16 and at their other sides by lines 39, 40 to the collectors of transistors Q3, Q4. The emitters of transistors Q3, Q4 are connected permanently via a line 41 to the common negative line 17. A capacitor C6 is connected between lines 39, 40 to act as a filter preventing any potential difference between the collectors of transistors Q3, Q4.

The two ends of primary coil 35 are connected by lines 42, 43 to the bases of transistors Q3, Q4. This coil is center tapped by a line 44 connected via resistor R9 to the positive line 16 and via resistor R10 to the common negative line 17.

When power is first applied to the circuit, transistors Q3 and Q4 will be in their non-conducting states and there will be no current in primary coils 34, 36. However, the positive current in line 16 will provide via resistor R9 a triggering signal applied to the center tap of coil 35, and this signal operates to trigger alternate high frequency oscillation of transistors Q3, Q4, which will result in rapid alternating pulses in primary coils 34, 36. The triggering signal applied to the center tap of coil 35 is controlled by the resistor network provided by resistors R9 and R10 such that its magnitude is not sufficient to enable it to trigger Q3 and Q4 simultaneously but is sufficient to trigger one of those transistors. Therefore only one of the transistors is fired by the initial triggering signal to cause a current to flow through the respective primary coil 34 or 36. The signal required to hold the transistor in the conducting state is much less than that required to trigger it initially, so that when the transistor becomes conductive, some of the signal applied to the center tap of coil 33 will be diverted to the non-conducting transistor to trigger it. When the second transistor is thus fired to become conductive, current will flow through the other of the primary coils 34, 36, and since the emitters of the two transistors are directly connected together, the positive output of the secnd transistor will cause the first-fired transistor to be shut off. When the current drawn by the collector of the second-fired resistor drops, part of the signal on the center tap of coil 35 is diverted back to the collector of the first transistor which is re-fired. It will be seen that the cycle will then repeat indefinitely, so that transistors Q3, Q4 are alternately fired and shut off in very rapid sequence. Thus current pulses flow in alternate sequence through primary coils 34, 36 at a very high frequency, this frequency being constant and independent of changes in input voltage to the circuit. The rapidly alternating pulses in primary coils 34 and 36, which will continue for so long as master control switch 18 remains closed, will generate higher voltage signals at the same frequency in the transformer secondary coil 32.

A dump capacitor C5 bridged by a resistor R8 is connected by a line 46 to the line 31 from the secondary coil of transformer TR1 and provides the output from that transformer which is fed via line 47 to a second state transformer TR2.

When thyristor T1 is triggered to become conductive the full charge of dump capacitor C5 is released to second stage transformer TR2. At the same time the first stage of transformer TR1 ceases to function because of this momentary short circuit placed across it and consequently thyristor T1 releases, i.e. becomes non-conductive. This permits charge to be built up again in dump capacitor C5 for release when the thyristor is next triggered by a signal from transistor Q2. Thus during each of the intervals when the thyristor is in its non-conducting state the rapidly alternating pulses in primary coils 34, 36 of transformer TR1 produced by the continuously oscillating transistors Q3, Q4 produce, via the transformer coupling, relatively high voltage output pulses which built up a high charge in capacitor C5 and this charge is released suddenly when the thyristor is triggered. In a typical apparatus using the 12 volt DC supply at terminals 14, 15 pulses of the order of 22 amps at 300 volts may be produced in line 47.

As previously mentioned relay RL1 is provided in the circuit to provide a delay in the connection of capacitor C2 to the common negative line 17. This delay, although very short, is sufficient to enable transistors Q3, Q4 to start oscillating to cause transformer TR1 to build up a charge in dumping capacitor C5 before the first triggering signal is applied to thyristor T1 to cause discharge of the capacitor.

As thus far described, the circuits of FIGS. 1 and 2 are identical, and both employ electrical conversion means TR2, which may be a second stage transformer. However, in the case of the circuit shown in FIG. 1 the second stage transformer TR2 is a step-down transformer which produces pulses of very high current flow at low voltage whereas the second stage transformer TR2 of FIG. 2 is a step-up transformer which tends to produce pulses of very high voltage. In both cases the second stage transformer will be built into the anode of the electrolytic cell 11. The physical construction will be similar in the two cases in that each comprises a primary coil 48 and a second coil 49 wound about a core 51 but the secondary coil of the step-down transformer would need to be much heavier than that of the step-up transformer in order to handle the current induced in it.

In the circuit of FIG. 1 which uses a step-down second stage transformer TR2 the secondary coil 49 is connected only between the anode 12 and cathode 13 of electrolytic cell 11.

In the circuit of FIG. 2 which uses the step-up second stage transformer the secondary coil is connected not only between the anode and cathode but also back to the negative side of primary coil 48. As will be explained below, the design of cell 11 is such that the high voltage output from this coil actually induces in the electrolyte solution very large current pulses at relatively low voltage.

In a typical apparatus the output from the first stage transformer TR1 would be 300 volt pulses of the order of 22 amps at 10,000 pulses per minute at a duty cycle of slightly less than 0.1. This can be achieved from a uniform 12 volt and 40 amps DC supply applied between terminals 14, 15 using the following circuit components:

| | |
|---|---|
| R1 | 2 K ohms ½ watt 2% resistor |
| R2 | 220 ohms ½ watt 2% resistor |
| R3 | 100 ohms ½ watt 2% resistor |
| R4 | 22 K ohms ½ watt 2% resistor |
| R5 | 100 ohms ½ watt 2% resistor |
| R6 | 220 ohms ½ watt 2% resistor |
| R7 | 1 K ohms ½ watt 2% resistor |
| R8 | 10 M ohms 1 watt 5% resistor |
| R9 | 100 ohms 5 watt 10% resistor |
| R10 | 5.6 ohms 1 watt 5% resistor |
| C1 | 2200 MF 16V electrolytic capacitor |
| C2 | 2.2 MF 100V 10% capacitor |
| C3 | 2.2 MF 100V 10% capacitor |
| C4 | 1 MF 100V 10% capacitor |
| C5 | 1 MF 1000V Ducon paper capacitor 5 S10A |
| C6 | .022 MF 160V capacitor |
| Q1 | 2N 2647 PN unijunction transistor |
| Q2 | 2N 3055 NPN silicon power transistor |
| Q3 | 2N 3055 NPN silicon power transistor |
| Q4 | 2N 3055 NPN silicon power transistor |
| T1 | BTW 30 800RM fast turn-off thyristor |
| D1 | A 14 P diode |
| D2 | A 14 P diode |
| RL1 | PW5LS hermetically sealed relay |
| PS1 | P658A-10051 pressure switch |
| TR1 | Half-cup transformer cores 36/22-341 Coil former 4322-021-30390 wound to provide a turns ratio between secondary and primary of 18:1 |

-continued
Secondary coil 32 = 380 turns
Primary coil 34 = 9 turns
Primary coil 36 = 9 turns
Primary coil 35 = 4 turns Transistors Q2, Q3 and Q4 each need to be mounted on a heat sink and a suitable heat-sink for this purpose is 35D 3CB. The other circuit components may be installed in a steel container and the heat sink mounted transistors fitted to an exterior surface of the steel container. Alternatively it would be possible to mount at least transistor Q2 within the box if an appropriate heat sink with extended surface area is provided within the box.

The physical construction of electrolytic cell 11 and the second stage transformer TR2 is illustrated in FIGS. 3 to 8. The cell comprises an outer casing 71 having a tubular peripheral wall 72 and top and bottom closures 73, 74. Bottom closure 74 is comprised of a domed cover 75 and an electrically insulating disc 76 which are held to the bottom of peripheral wall 72 by circumferentially spaced clamping studs 77. Top closure 73 is comprised of a pair of top plates 78, 79 disposed face to face and held by circumferentially spaced clamping studs 81 screwed into tapped holes in the upper end of peripheral wall 72.

The anode 12 of the cell is of generally tubular formation. It is disposed vertically within the outer casing and is clamped between upper and lower insulators 82, 83. Upper insulator 82 has a cnetral boss portion 84 and an annular peripheral flange 85 portion, the outer rim of which is clamped between upper closure plate 79 and the upper end of peripheral wall 72. Lower insulator 83 has a central boss portion 86, an annular flange portion 87 surrounding the boss portion and an outer tubular portion 88 standing up from the outer margin of flange portion 87. Insulators 82, 83 are moulded from an electrically insulating material which is also alkali resistant. Polytetrafluoroethylene is one suitable material.

When held together by the upper and lower closures, insulators 82, 83 form an enclosure within which anode 12 and the second stage transformer TR2 are disposed. Anode 12 is of generally tubular formation and it is simply clamped between insulators 82, 83 with its cylindrical inner periphery located on the boss portions 84, 86 of those insulators. It forms a transformer chamber which is closed by the boss portions of the two insulators and which is filled with a suitable transformer oil. An O-ring seal 90 is fitted between insulator boss 86 and the anode to prevent loss of oil from the transformer chamber.

The transformer core 51 is formed as a laminated mild steel bar of approximately ¾ inch square section. It extends vertically between the insulator boss portions 84, 86 and its ends are located within recesses in those boss portions. The primary transformer winding 48 is wound directly onto core 59 whereas the secondary winding 49 is wound on a tubular former 89 so as to be spaced outwardly from the primary winding within the oil filled transformer chamber.

The cathode 13 is in the form of a longitudinally slotted tube which is a close fit within the outer tubular portion 88 of insulator 83. It has eight equally spaced longitudinal slots 91, so that it is essentially comprised of eight cathode strips 92 disposed between the slots and connected together a top and bottom only.

Both the anode and cathode are made of solid nickel. The outer periphery of the anode is machined to form eight circumferentially spaced flutes 93 which have arcuate roots meeting at sharp crests or ridges 94 defined between the flutes. The eight anode crests 94 are radially aligned centrally of the cathode strips 92, and the perimeter of the anode measured along its external surface is equal to the combined widths of the cathode strips measured at the internal surfaces of these strips, so that over the major part of their lengths the anode and cathode have equal effective areas. This equalization of areas generally has not been available in prior art cylindrical anode/cathode arrangements.

The annular space 95 between the anode and cathode serves as the electrolyte solution chamber. This chamber is divided by a tubular membrane 96 made of nickel film of no more than 0.015 inch thickness perforated by holes of no more than 0.004 inch diameter of 5000 perforations per square inch. This perforated membrane serves as a barrier against mixing of hydrogen and oxygen generated at the cathode and anode respectively while permitting the electrolytic flow of current between the electrodes. Its ends fit into annular slots in the peripheral flanges of upper and lower insulators 82, 83 whereby it is electrically isolated from all other components of the cell. This barrier may alternatively be formed by a tightly stretched web of nylon mesh material of sufficiently small mesh size, i.e. such that the mesh openings will not pass bubbles of greater than 0.004 inch diameter. The mesh material may be stretched between end rings of a plastic holder fitted between the annular slots in insulators 82, 83.

Initially chamber 95 is filled approximately 75% full with an electrolyte solution of 25% potassium hydroxide in distilled water. Thereafter, as the reaction progresses, the water is depleted and is made up with fresh water admitted into the outer section of chamber 95 via an inlet nozzle 97 formed in upper closure plate 78. The electrolyte solution passes from the outer to the inner section of chamber 95 via the holes in membrane 96. It will be noted however, that membrane 96 is perforated only below the level of the electrolyte solution so that there may be no mixing of hydrogen and oxygen within the cell. The holes, while large enough to allow passage of electrolyte solution therethrough are small enough to prevent passage of bubbles of hydrogen and oxygen normally occurring in the reaction. In the case where the gas barrier is formed by nylon mesh the upper ring of the holder would be formed to provide a solid barrier above the level of the electrolyte solution.

Nozzle 97 has a flow passage 98 extending to an electrolyte inlet valve 99 controlled by a float 101 in chamber 95. Valve 99 comprises a bushing 102 mounted within an opening extending downwardly through upper closure plate 78 and the peripheral flange 85 of upper insulator 82 and providing a valve seat which cooperates with valve needle 103. Needle 103 is lightly biased upwardly by a spring 104 within valve bushing 102. However, the pressure of electrolyte solution within nozzle 97 is sufficient to push the needle downwardly against this spring to allow admission of electrolyte solution to chamber 95 until float 101 lifts the needle hard against the valve seat. The float slides vertically on a pair of star-section slide rods 106 extending between the upper and lower insulators 82 and 83 and also formed of polytetrafluoroethylene. These rods extend through appropriate holes 107 through the float.

The depth of float 101 is chosen such that the electrolyte solution fills only approximately 75% of the chamber 95, leaving the upper part of the chamber as a gas space which can accommodate expansion of the generated gas due to heating within the cell.

As electrolysis of the electrolyte solution within chamber 95 proceeds, hydrogen gas is produced at the cathode, and oxygen gas is produced at the anode. These gases bubble upwardly into the upper part of chamber 95 where they remain separated in the inner and outer compartments defined by membrane 96, and it should be noted that the electrolyte solution enters that part of the chamber which is filled with oxygen rather than hydrogen so that there is no chance of leakage of hydrogen back through electrolyte inlet nozzle 97.

The abutting faces of upper closure plates 78, 79 have matching annular grooves forming within the upper closure inner and outer gas collection passages 108, 109. Outer passage 108 is circular, and it communicates with the hydrogen compartment of chamber 95 via eight ports 111 extending downwardly through top closure plate 79 and the peripheral flange of upper insulator 82 adjacent the cathode strips 92. Hydrogen gas flows upwardly through ports 111 into passage 108 and thence upwardly through a one-way valve 112 (FIG. 8) into a reservoir 113 provided by a plastic housing 114 bolted to top closure plate 78 by a centre stud 115 and sealed by a gasket 116. The lower part of housing 114 is charged with water 117, and the hydrogen passes inwardly into reservoir 113 via a tube 118. Valve 112 comprises a bushing 119 providing a valve seat for valve stem 121 which is biased downwardly by a spring 122 and also be the weight of water acting on it.

Hydrogen is withdrawn from reservoir 113 via a crooked tube 123 which connects with a outlet passage 124 in top closure plate 78. Outlet passage 124 terminates in a hydrogen delivery nozzle 125 which may deliver the hydrogen either to storage or directly to the point of consumption.

Oxygen is withdrawn from chamber 95 via the inner annular passage 109 in the top closure. Passage 109 is not circular but has a scalloped configuration to extend around the electrolyte inlet. Oxygen enters it through seven ports 131 extended through top closure plate 79 and the annular flange portion of upper insulator 82. The oxygen flows upwardly from passage 109 through a one-way valve 132 and into a reservoir provided by a plastic housing 134. The arrangement is similar to that for withdrawal of hydrogen and will not be described in great detail. Suffice to say that the bottom of the chamber is charged with water and the oxygen is withdrawn through a crooked tube 135 and an outlet passage 136 in top closure plate 78 terminating in an oxygen delivery nozzle 137.

The pressure sensing tube 20 of control switch 19 is connected directly to the upper part of chamber 95 via passage 138 in top closure plate 79 and upper insulator 82 to sense the hydrogen pressure within the upper part of this chamber. If this pressure rises above a predetermined level switch 19 operates to disconnect capacitor C2 from the common negative line 17. This removes the negative signal from capacitor C2 which is necessary to maintain continuous operation of the pulse generating circuitry for generating the triggering pulses on thyristor T1 and these triggering pulses therefore cease. The transformer TR1 continues to remain in operation to charge dumping capacitor C5, but because thyristor T1 cannot be triggered, dumping capacitor C5 will simply remain charged until the hydrogen pressure in chamber 95 falls below the predetermined level and triggering pulses are applied once more to thyristor T1. Pressure switch 19 thus controls the rate of gas production according to the rate at which it is withdrawn. It is thus possible for example to feed the hydrogen and oxygen gases directly to an internal combusion chamber without intermediate storage, and the apparatus will produce the gases according to demand. The stiffness of the control springs for gas escape valves 112, 132 must of course be chosen to allow escape of the hydrogen and oxygen in the proportions in which they are produced by electrolysis, i.e. in the ratios 2:1 by volume.

Reservoirs 113, 133 are provided as a safety precaution. If a sudden back-pressure were developed in the delivery pipes this could only shatter the plastic housings 114, 134 and could not be transmitted back into the electrolytic cell. Switch 19 would then operate to stop further generation of gases within the cell.

Figure 4:
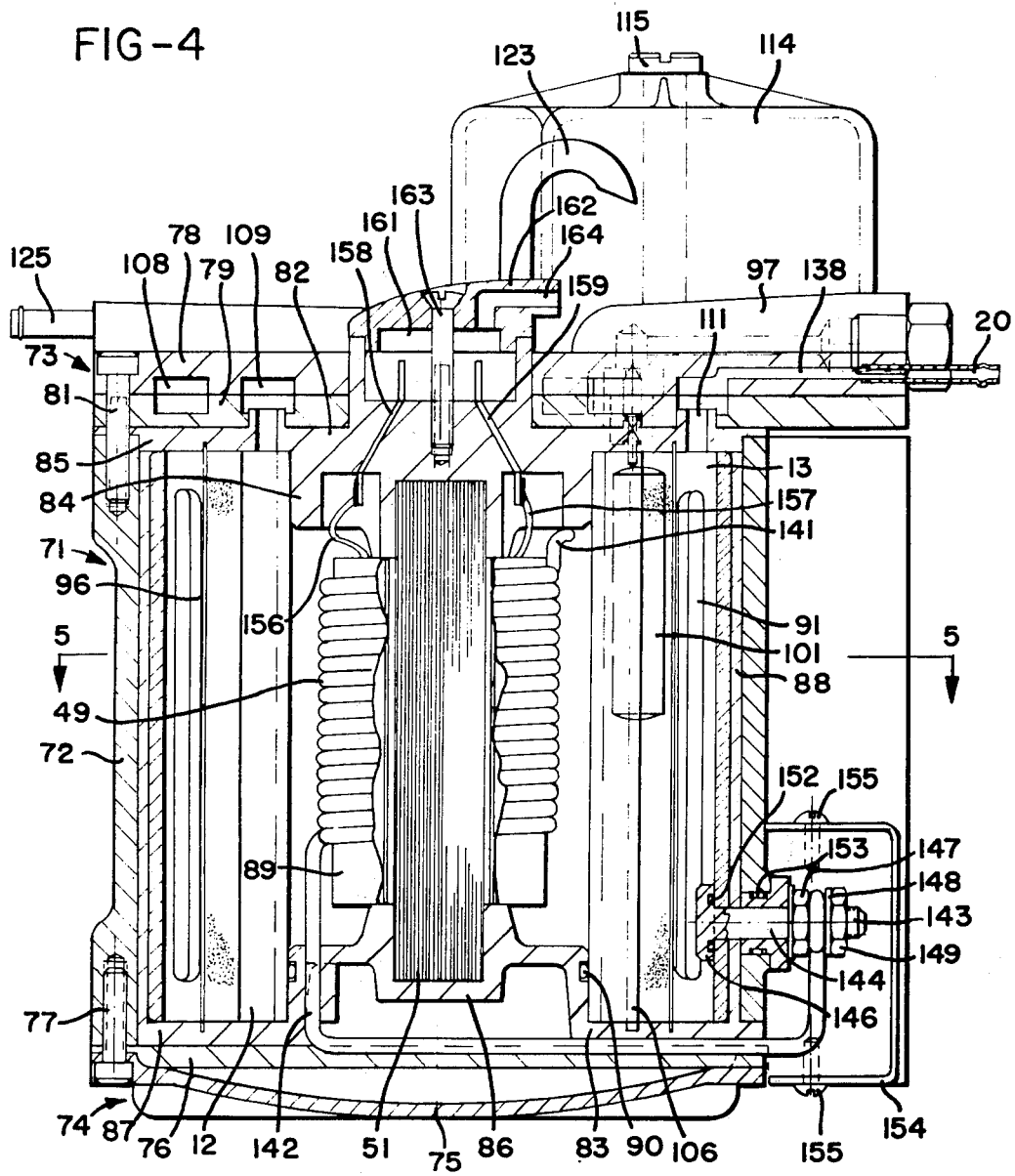
FIG. 4 is a cross-section on the line 4—4 in FIG. 3.
Figure 5:
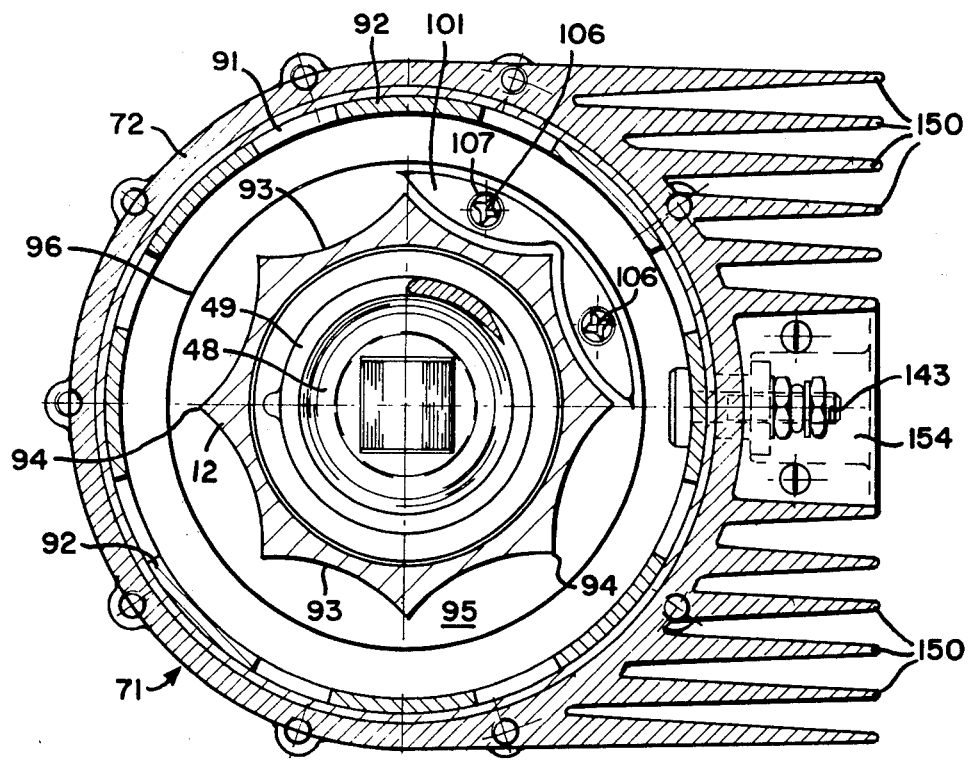
FIG. 5 is a cross-section on the line 5—5 in FIG. 4.
Figure 6:
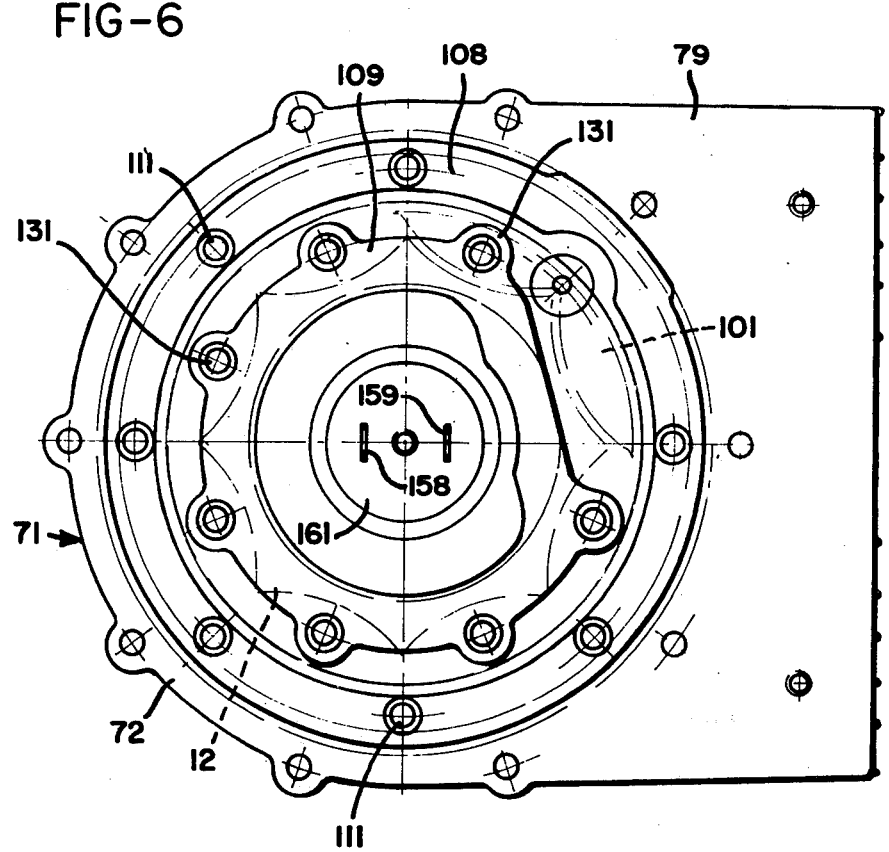
FIG. 6 is a plan view of the electrolytic cell with certain upper parts removed.
Figure 7:
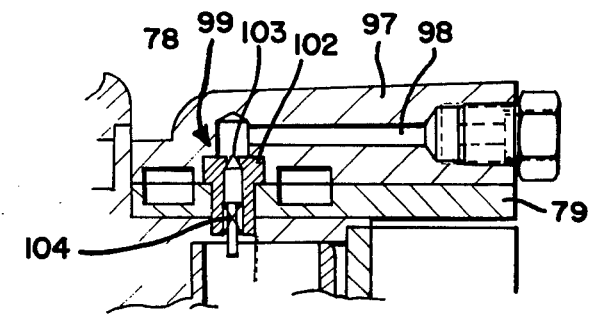
FIG. 7 is a cross-section on the line 7—7 in FIG. 3.
Figure 8:
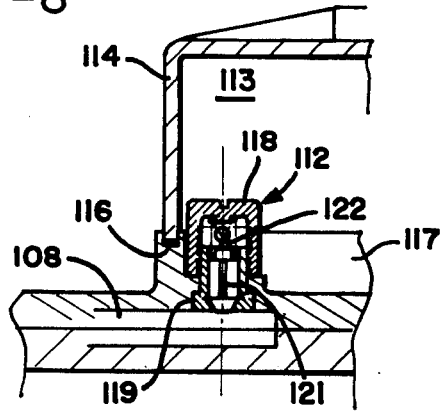
FIG. 8 is a cross-section on the line 8—8 in FIG. 3.

The electrical connections of secondary transformer coil 49 to the anode and the cathode are shown in FIG. 4. One end of coil 49 is connected to the anode by a wire 141, this connection being entirely within the anode. The other end of coil 49 is connected to the cathode via a wire 142 which extends downwardly through a hole in the bottom insulator 83 and then horizontally to leave casing 71 between bottom insulating disc 76 and insulator 83. The upper face of disc 76 and the lower face of insulator 83 are grooved to receive and clamp onto wire 142. Outside the casing, wire 142 is connected to a cathode terminal bolt 143. Terminal bolt 143 has a stem 144 extending through an opening in the cathode and an insulating bush 144 fitted in an aligned opening in the casing wall 72. The head 146 of the terminal bolt is drawn against the inner periphery of the cathode by tightening of a clamping nut 147, and the end of wire 142 has an eye which is clamped between nut 147 and a washer 148 by tightening a terminal end nut 149. A washer 151 is provided between nut 147 and bush 144, and sealing O-rings 152,153 are provided between bolt head 146 and the cathode and between bush 144 and casing wall 72 to prevent escape of electrolyte solution. The terminal connection is covered by a housing 154 held in place by fixing screws 155.

The two ends of the primary transformer coil 48 are connected by wires 156,157 to conductors 158,159 which extend upwardly through the central boss portion of upper insulator 83. The upper ends of conductors 158, 159 project upwardly as pins within a socket 161 formed in the top of upper insulator 82. The top of socket 161 is closed by a cover 162 which is held by a centre stud 163 and has a passage 164 through which wires from the external circuit may be extended and connected to conductors 158,159 by any suitable connector (not shown) located within socket 161.

Figure 3:
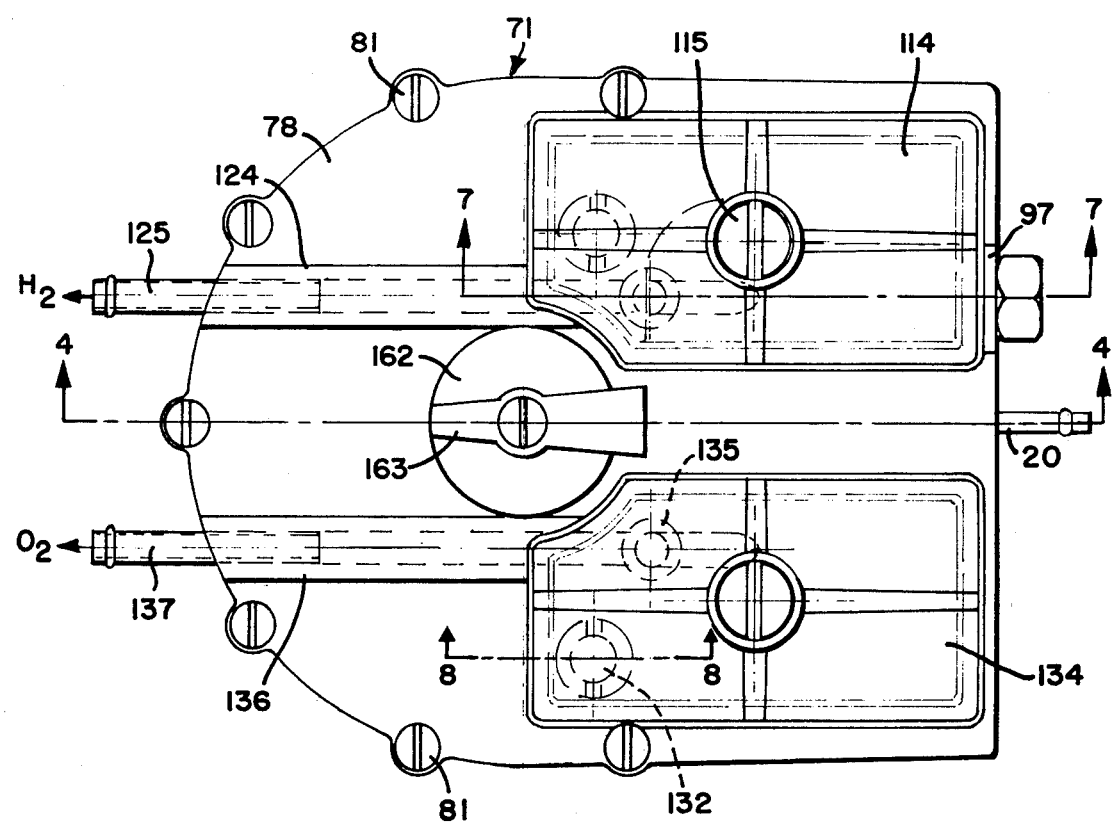
FIG. 3 is a plan view of an electrolytic cell of the apparatus.

The transformer connections shown in FIG. 3 are in accordance with the circuit of FIG. 1, i.e. the ends of secondary coil 49 are connected only between the anode and the cathode. Transformer TR2 will then be a step-down transformer. Assuming an input of pulses of 22 amps at 300 volts and a coil ratio between the primary and scondary of 10:1 the output applied between the anode and the cathode will be pulses of 200 amps at a low voltage of the order of 3 volts. The voltage is well in excess of that required for electrolysis to proceed and the very high current achieved produces a high rate of yield of hydrogen and oxygen.

In the case of the circuit shown in FIG. 2 a simple electrical connection would be made within the anode between wire 142 and whichever of conductors 158,159 is connected to the negative side of primary coil 48. The winding of transformer coils 48 and 49 would be altered to provide a step-up in voltage. Assuming an input of 22 amps at 300 volts and a coil ratio of 100:1 the output applied to the anode and cathode would then be 220 milliamps at 30,000 volts. The very large voltage thus applied between the anode and cathode causes the electrolytic cell to produce a very large current within the electrolyte solution at a low voltage. More particularly, the cell will produce from the applied 30,000 volt pulses, current pulses of 220 amps at low voltages between about 2 volts and 7 volts. As in the previous case, the very large current flow in the electrolyte solution produces a high rate of yield of hydrogen and oxygen at the electrodes. The rapid discharge of energy which produces the large current flow will be accompanied by a release of heat. This energy is not entirely lost in that the consequent heating of the electrolyte solution increases the mobility of the ions which tends to increase the rate of electrolysis.

The configuration of the anode and cathode arrangement of electrolytic cell 11 is of significant importance. The fluted external periphery of the anode causes a concentration of current flow which produces a better gas yield over a given electrode area. This particular configuration also causes the surface area of the anode to be extended and permits an arrangement in which the anode and cathode have equal surface areas which is most desirable in order to minimize electrical losses. It is also desirable that the anode and cathode surfaces at which gas is produced be roughened, for example by sand-blasting. This promotes separation of the gas bubbles from the electrode surfaces and avoids the possibility of overvoltages. The anode and cathode may both be made of nickel but this is not essential, and they might alternatively be formed of nickel plated steel, or they could be made of platinum or be platinum plated.

The arrangement of the secondary transformer in which the central anode is surrounded by the cathode is also of great importance. The anode, being constructed of a magnetic material is acted on by the magnetic field of transformer TR2 to become, during the period of energization of that transformer, a strong conductor of magnetic flux. This in turn creates a strong magnetic field in the inter-electrode space between the anode and the cathode. It is believed that this magnetic field increases the mobility of the ions in solution thereby improving the efficiency of the cell.

The heat generated by transformer TR2 is conducted via the anode to the electrolyte solution and also increases the mobility of the ions within the electrolyte solution and thus also contribute to the progress of electrolysis. If desired for dissipation of heat there may be provided cooling fins such as fins 150. The location of the transformer within the anode also enables the connections of the secondary coils 49 to the anode and cathode to be made of short, well protected conductors. In the case where transformer TR2 serves to step-up the voltage, the arrangement of a central anode surrounded by a cathode is highly desirable.

Dumping capacitor C5 will determine a ratio of charging time to discharge time which will be largely independent of the pulse rate. The pulse rate determined by the unijunction transistor Q1 must be chosen so that the discharge time is not so long as to produce overheating of the transformer coils and more particularly the secondary coil 49 of transformer TR2. Experiments have been performed upon small devices such as that illustrated at repetition rates ranging from about 5,000 pulses per minute to about 40,000 pulses per minute a current of about 220 amps and a voltage of about 3 volts. It was found that overheating problems were encountered at pulse rates below about 5,000 and that the system behaved much like a DC system, with consequently reduced performance at pulse rates greater than about 40,000. A pulse rate of about 10,000 pulses per minute was found to be nearly optimum under the test conditions for the particular arrangement under investigation. With the saw tooth wave input and sharply output pulses of the preferred oscillator circuit the duty cycle of the pulses produced at a frequency of 10,000 pulses per minute was about 0.006. This pulse form helps to minimise overheating problems in the components of the oscillator circuit at the high pulse rates involved. A duty cycle of up to about 0.1, as may result from a square wave input, would be feasible but at a pulse rate of 10,000 pulses per minute some of the components of the oscillator circuit would then be required to withstand unusually high heat inputs. A duty cycle of about 0.005 would be a minimum which could be obtained with the illustrated type of oscillator circuitry. In general it is believed that pulsed current is superior to DC current, even outside the above range, because the electrodes have an opportunity to become naturally depolarized by the departure of gas bubbles from the electrodes during the time period between pulses.

The illustrated electrolytic cell 11 is designed to produce hydrogen and oxygen at a rate sufficient for operation of internal combustion engines and other uses known in the art. Typically it may have a diameter of about 8 inches and a height of about 8 inches, so that it will be seen to be extremely compact. The illustrated apparatus has been advanced by way of example only and the invention is in no way limited to the details of this particular apparatus. It will be appreciated that the present invention will permit the generation of hydrogen and oxygen in large quantities for purposes such as power generation in massive fixed installations. These would require much higher electrical inputs and the electrical circuitry would need to be designd accordingly. Although in small apparatus it is preferred to make transformer TR2 a step-down transformer large gas generating equipment operating with high electrical inputs would generally use a step-up transformer TR2 to avoid the generation of extremely large currents in the secondary coil and consequently avoid very heavy conductors.

While the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. Electrolysis apparatus comprising:
   a. an electrolytic cell to hold an electrolytic conductor and including an anode and a cathode to contact the electrolytic conductor, and b. electrical supply means to apply between the anode and the cathode of the electrolytic cell pulses of electrical energy to induce a pulsating current in the electrolytic conductor wherein the electrical supply means comprises a source of direct current electrical energy of substantially uniform voltage and current and electrical converter means to convert that energy to said pulses, which converter means is such that said pulses as applied between the anode and cathode are each at a greater current value than said uniform current and a lower voltage than said uniform voltage.

2. Electrolysis apparatus as claimed in claim 1, wherein the electrical conversion means is a voltage step-down transformer comprising a primary coil to receive the pulse discharge from said dump capacitor and a secondary coil electrically connected between the anode and cathode and inductively coupled to the primary coil.

3. Electrolysis apparatus comprising:
  a. an electrolytic cell to hold a electrolytic conductor and including an anode and a cathode to contact the electrolytic conductor, and
  b. electrical supply means to apply between the anode and the cathode of the electrolytic cell pulses of electric energy to induce a pulsating current in the electrolytic conductor, wherein the electrical supply means comprises a source of direct current electrical energy of substantially uniform voltage and current and electrical converter means to convert that energy to said pulses which converter means comprises a transformer means having primary coil means energized by direct current energy from said source and secondary coil means inductively coupled to the primary coil means; a dump capacitor connected to the secondary coil means of the transformer means so as to be charged by electrical output of that coil means; oscillator means to derive electrical pulses from direct current energy of said source; a switching device switchable from a non-conducting state to a conducting state in response to each of the electrical pulses derived by the oscillator means and connected to the scondary coil means of the transformer means and the dump capacitor such that each switching from its non-conducting state to its conducting state causes the dump capacitor to discharge and also short circuits the transformer means to cause the switching means to revert to its non-conducting state; and electrical conversion means to receive the pulse discharges from the dump capacitor and to convert them to said pulses of electrical energy which are applied between the anode and cathode.

4. Electrolysis apparatus comprising:
  a. an electrolytic cell to hold an electrolytic conductor and including an ancde and a cathode to contact the electrolytic conductor, and
  b. electrical supply means to apply between the anode and the cathode of the electrolytic cell pulses of electrical energy to induce a pulsating current in the electrolytic conductor, wherein the cathode encompasses the anode, and the electrical supply means comprises a source of direct current electrical energy of substantially uniform voltage and current and electrical converter means to convert that energy to said pulses such that said pulses are each at a greater voltage than said uniform voltage which greater voltage causes discharges between the anode and cathode so as to produce in the electrolytic conductor pulses of current which are greater than said uniform current and constitute said pulsating current.

5. Electrolysis apparatus as claimed in claim 4, wherein the cathode encompasses the anode.

6. Electrolysis apparatus as claimed in claim 5, wherein the anode is hollow and the primary and secondary coils of the second transformer means are disposed within it.

7. Electrolysis apparatus as claimed in claim 6, wherein the anode is tubular and its ends are closed to form a chamber which contains the primary and secondary coils of the second transformer means and which is charged with oil.

8. Electrolysis apparatus as claimed in claim 4, wherein that side of the secondary coil of said second transformer means which is connected to the cathode is also connected to the negative side of the primary coil of the second transformer means.

9. Electrolysis apparatus comprising:
  a. an electrolytic cell to hold an electrolytic conductor and including an anode and cathode to contact the electrolytic conductor; and
  b. electrical supply means to apply between the anode and the cathode of the electrolytic cell pulses of electrical energy to induce a pulsating current in the electrolytic conductor, wherein the electrical supply means comprises a source of direct current electrical energy of substantially uniform voltage and current and electrical converter means to convert that energy to said pulses which converter means comprises a first transformer means having primay coil means energized by direct current energy from said source and a secondary coil means inductively coupled to the primary coil means; a dump capacitor connected to the secondary coil means of the first transformer means so as to be charged by electrical output of that coil means; oscillator means to derive electrical pulses from direct current energy of said source; a switching device switchable from a non-conducting state to a conducting state in response to each of the electrical pulses derived by the oscillator means and connected to the secondary coil means of the first transformer means and the dump capacitor such that each switching from its non-conducting state to its conducting state causes the dump capacitor to discharge and also short circuits the first transformer means to cause the switching means to revert to its non-conducting state; and second transformer means comprising a primary coil to receive the pulse discharges from the dump capacitor of the converter means and a secondary coil inductively coupled to the first coil to produce a voltage step-up and electrically connected between the anode and the cathode.

10. Apparatus according to claim 9, wherein said current generating means comprises a transformer situated inside said first electrode.

11. Apparatus acroding to claim 10, wherein the secondary winding of said transformer is connected whereby said first electrode operates as an anode and said second electrode operates as a cathode.

12. Apparatus according to claim 11, wherein said current generating means further comprises means to generate a pulsed exciting current to the primary winding of said transformer.

13. Apparatus according to claim 9, wherein said current generating means comprises a source of direct current; a transformer means having primary coil means energized by direct current energy from said source and secondary coil means inductively coupled to the primary coil means; a dump capacitor connected to the secondary coils means of the transformer means so as to be charged by electrical output of that coil means; oscillator means to derive electrical pulses from direct current energy of said source; a switching device switchable from a nonconducting state to a conducting state in response to each of the electrical pulses derived by the oscillator means and connected to the second coil means of the transformer means and the dump capacitor such that each switching from its non-conducting state to its conducting state causes the dump capacitor to discharge and also short circuits the transformer means to cause the switching means to revert to its non-conducting state; and electrical conversion means to receive the pulse discharges from the pump capacitor and to convert them to pulses of electrical energy which are applied between said first and second electrodes.

14. Apparatus according to claim 13, further comprising delay means to delay the first discharge from said dump capacitor a period of time sufficiently long to enable substantially full charging thereof.

15. Electrolysis apparatus comprising:
   a. an electrolytic cell to hold an electrolytic conductor;
   b. first tubular electrode disposed within the cell and having a fluid external peripheral surface comprised of outwardly concave longitudinally extending flutes meeting at sharp longitudinally extending crests spaced circumferentially around said electrode;
   c. a second tubular electrode surrounding said first electrode and segmented into a series of electrically connected, circumferentially spaced, longitudinally extending strips, said strips being equal in number to the number of said flutes; said strips being disposed in radial alignment with said crests such that each said crest is directed toward the centerline of the respective strip midway between the side edges of that strip; and said strips having a total active surface area approximately equal to the total active surface area of said flutes; and
   d. current generating means for generating a flow of electrolyzing current between said first and second electrodes.

16. Electrolysis apparatus as claimed in claim 15, wherein said current generating means is such that the electrolyzing current flows between said first and second electrodes with the first electrode operating as an anode and the second electrode operating as a cathode.

17. Electrolysis apparatus comprising:
   a. an electrolytic cell to hold an aqueous electrolytic conductor and including an anode and a cathode to contact the electrolytic conductor; and
   b. electrical supply means for producing electrolysis in the aqueous electrolytic conductor between the anode and the cathode, said electrical supply means comprising:
   a source of direct current electrical energy of substantially uniform voltage and current;
   a first transformer having a primary coil energized by direct current energy from said source and a secondary coil inductively coupled to the primary coil;
   a dump capacitor connected to the secondary coil of the first transformer so as to be charged by the electrical output of that coil;
   oscillator means to derive electrical pulses from direct current energy of said source;
   a switching device switchable from a non-conducting state to a conducting state in response to each of the electrical pulses derived by the oscillator means and connected to the secondary coil of the first transformer and the dump capacitor such that each switching from its non-conducting state to its conducting state causes the dump capacitor to discharge and also short circuits the first transformer to cause the switching means to revert to its non-conducting state; and
   a second transformer comprising a primary coil to receive the pulses discharged from the dump capacitor and a secondary coil inductively coupled to the first coil to produce a voltage step-up.

18. Electrolysis apparatus as claimed in claim 17, wherein the cathode encompasses the anode, the anode is hollow and the primary and secondary coils of the second transformer are disposed within the anode.

19. Electrolysis apparatus as claimed in claim 18, wherein the anode is tubular and its ends are closed to form a chamber which contains the primary and secondary coils of the second transformer and which is charged with oil.

20. Apparatus according to claim 18, wherein the roots of said flutes are cylindrically curved.

21. Electrolysis apparatus as claimed in claim 17, wherein the anode and cathode are disposed about a common central axis with the cathode encompassing the anode and wherein the anode has a fluted external peripheral surface comprised of outwardly concave flutes extending longitudinally of the central axis and meeting at sharp crests spaced circumferentially around the anode.

22. Electrolysis apparatus as claimed in claim 21, wherein the cathode is comprised of a plurality of electrically interconnected strips disposed in tubular array around the anode; said strips being equal to the number of said flutes and said strips being disposed in radial alignment with said crests such that each crest is directed toward the centerline of the respective strip midway between the side edges of that strip.

* * * * *